D. J. IRISH.
APPARATUS FOR BURNING FINELY DIVIDED FUEL.
APPLICATION FILED JAN. 29, 1913.

1,086,715.

Patented Feb. 10, 1914.

4 SHEETS—SHEET 1.

WITNESSES:
P. McKergan
M. E. McKinch

INVENTOR
David J. Irish
BY
Gifford & Bull
his ATTORNEYS.

D. J. IRISH.
APPARATUS FOR BURNING FINELY DIVIDED FUEL.
APPLICATION FILED JAN. 29, 1913.

1,086,715.

Patented Feb. 10, 1914.

4 SHEETS—SHEET 2.

WITNESSES:
P. McKregan
M. E. McKinch

INVENTOR
David J. Irish
BY
Gifford Bull
his ATTORNEYS.

D. J. IRISH.
APPARATUS FOR BURNING FINELY DIVIDED FUEL.
APPLICATION FILED JAN. 29, 1913.
1,086,715.
Patented Feb. 10, 1914.
4 SHEETS—SHEET 3.
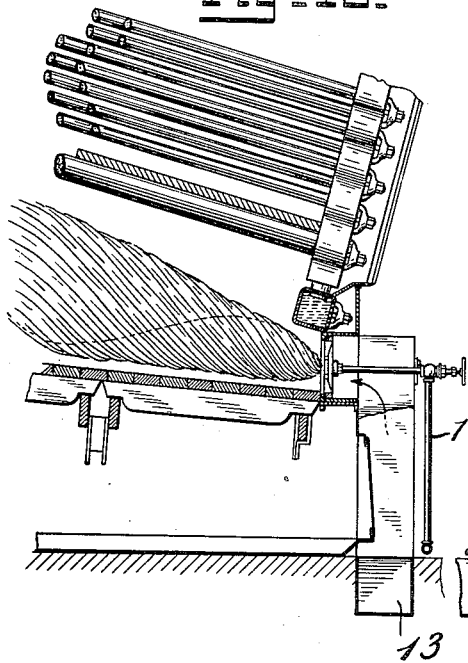
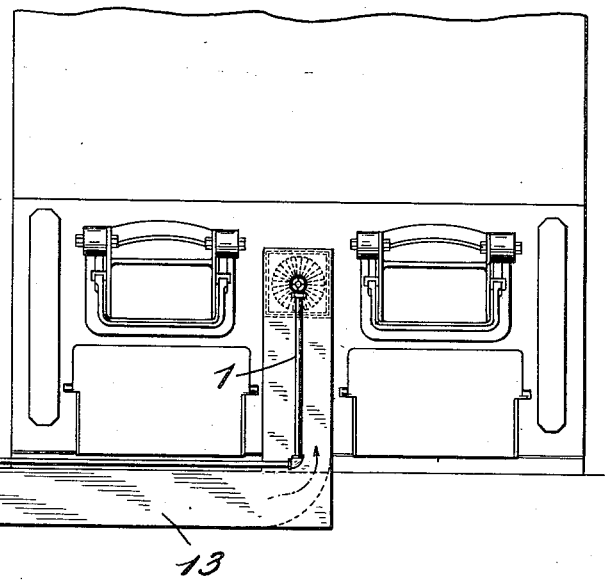
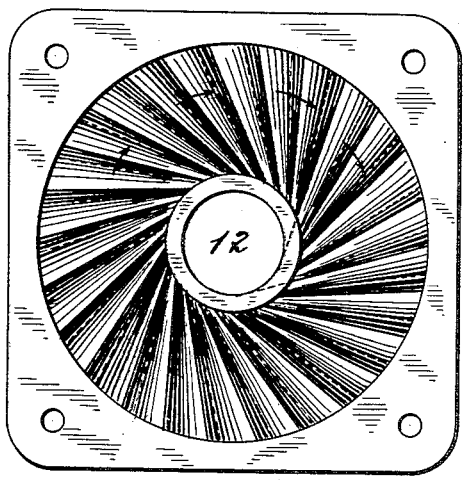
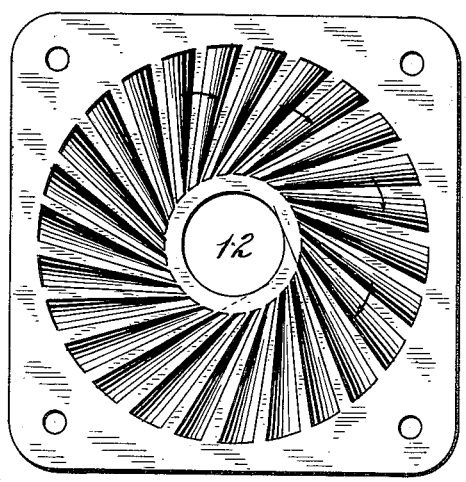

D. J. IRISH.
APPARATUS FOR BURNING FINELY DIVIDED FUEL.
APPLICATION FILED JAN. 29, 1913.
Patented Feb. 10, 1914.
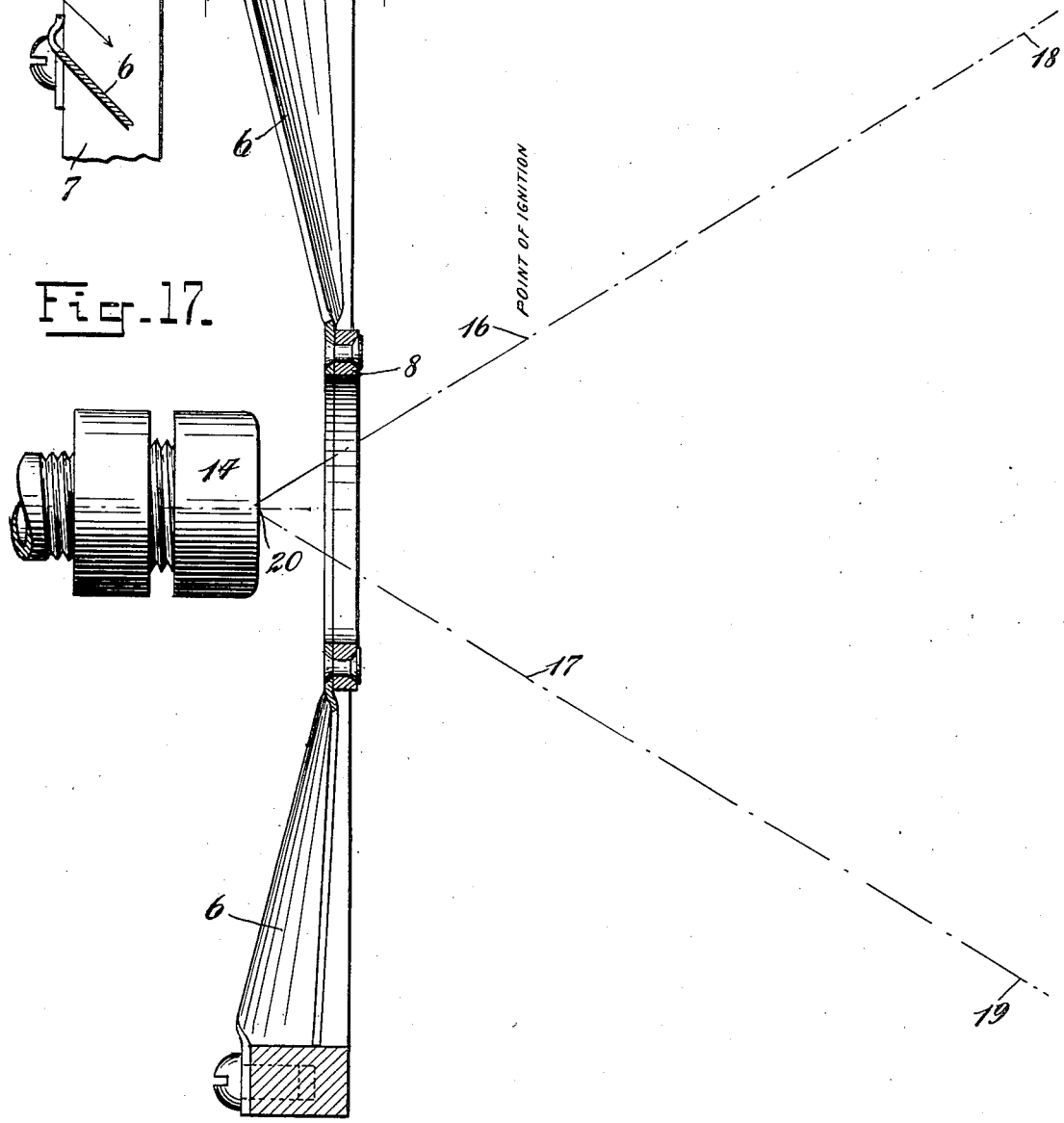

UNITED STATES PATENT OFFICE.

DAVID J. IRISH, OF NEW YORK, N. Y., ASSIGNOR TO THE BABCOCK & WILCOX COMPANY, OF BAYONNE, NEW JERSEY, A CORPORATION OF NEW JERSEY.

APPARATUS FOR BURNING FINELY-DIVIDED FUEL.

1,086,715.  Specification of Letters Patent.  Patented Feb. 10, 1914.

Original application filed July 3, 1911, Serial No. 636,632. Divided and this application filed January 29, 1913. Serial No. 745,009.

*To all whom it may concern:*

Be it known that I, DAVID J. IRISH, a citizen of the United States, residing at New York city, borough of Richmond, county of Richmond, State of New York, have invented certain new and useful Improvements in Apparatus for Burning Finely-Divided Fuel, of which the following is a specification.

The present application is a division of my application Serial No. 636,632, filed July 3, 1911.

The invention herein described relates to a plate for deflecting the air entering a combustion chamber around an atomizer or so-called burner, and to the general arrangement and construction of apparatus and devices employed for atomizing and burning liquid fuel.

The invention will be understood by reference to the accompanying drawings in which—

Figure 1:
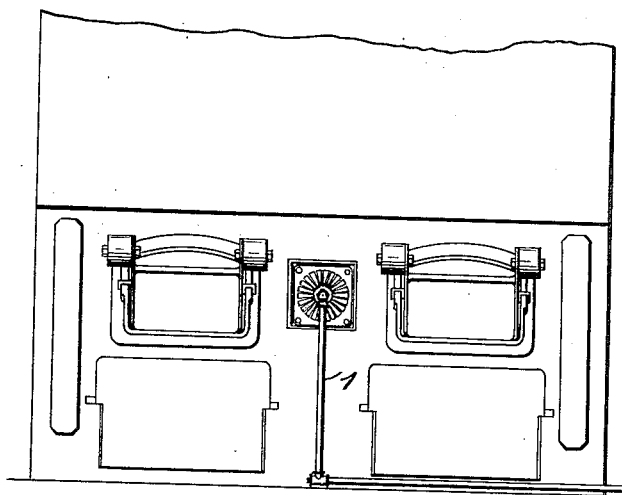
Figure 2:
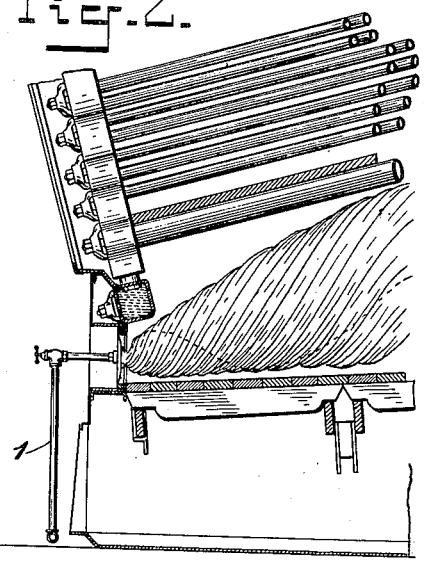
Figure 3:
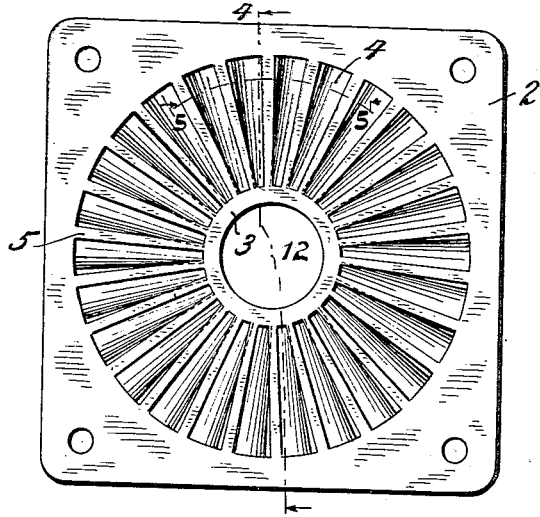
Figure 4:
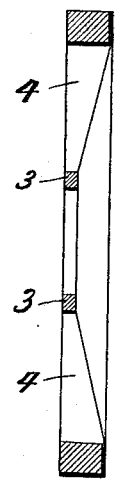
Figure 5:
Figure 7:
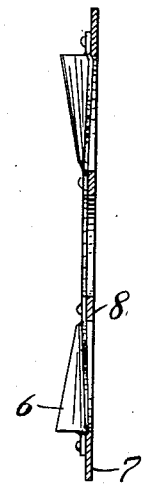
Figure 6:
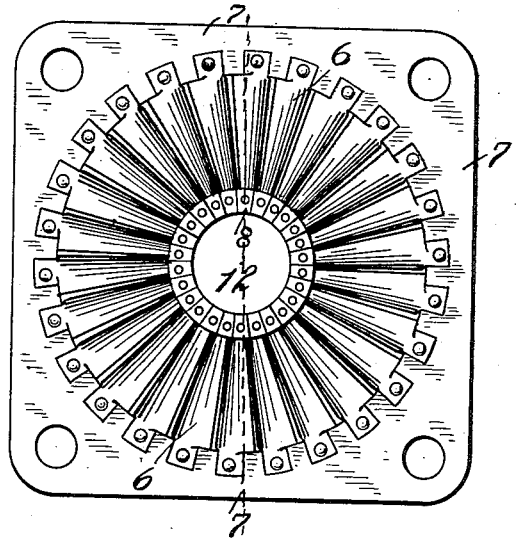
Figure 8:
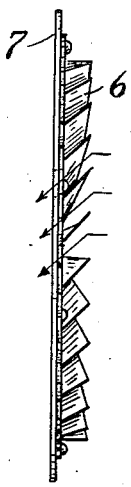
Figure 10:
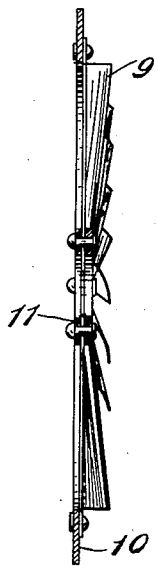
Figure 9:
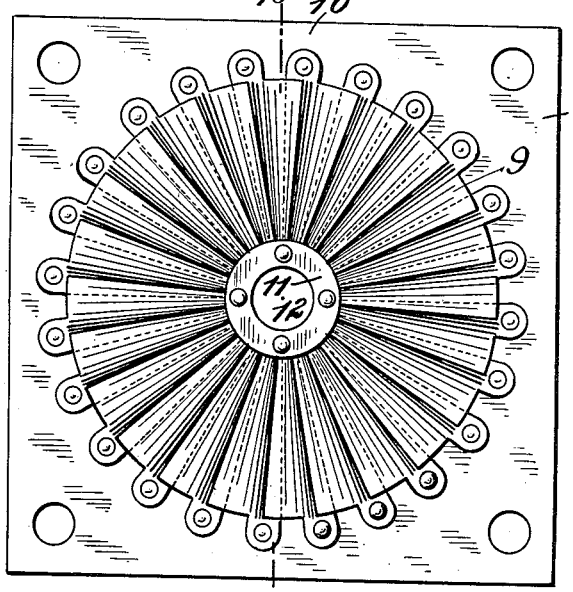
Figure 11:
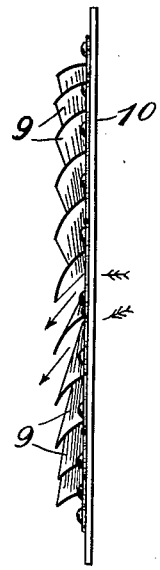

Figure 1 is a front elevation of a furnace adapted for burning fuel according to my invention; Fig. 2 a longitudinal section of a portion of the furnace; Fig. 3 a front elevation of one form of the air-deflecting plate; Fig. 4 a section on the plane of the line 4—4 of Fig. 3; Fig. 5 an enlarged section on the plane of the line 5—5 of Fig. 3; Fig. 6 a front elevation of another form of air-deflecting plate; Fig. 7 a section on the plane of the line 7—7 of Fig. 6; Fig. 8 an edge view of Fig. 6; Fig. 9 a front elevation of another form of air-deflecting plate; Fig. 10 a section on the plane of the line 10—10 of Fig. 9; Fig. 11 an edge view of Fig. 9; Fig. 12 a front elevation of the furnace showing a special air duct; Fig. 13 a longitudinal section of Fig. 12; Fig. 14 a front elevation of an air-deflecting plate having blades set tangentially to the central opening; Fig. 15 a similar view with the blades set in an opposite direction to the blades of Fig. 14; Fig. 16 a side view of the burner and a vertical axial section of the air-deflecting plate relatively located as used; and Fig. 17 a sectional detail on the plane of the line 17—17 of Fig. 16.

The prime object of all methods of burning finely-divided fuel is to obtain a continuous and intimate mixture of the fuel and an amount of air as nearly as possible equal to the theoretical quantity required to effect complete combustion. If the mixing process is not uniform and continuous, an intermittent explosive action takes place resulting in severe vibrations in the furnace. If the mixture is not thoroughly effected, a large excess of air is required with resultant loss in efficiency.

By the present invention I aim to secure a continuous, uniform and intimate mixture by causing the air which is being drawn or forced into the combustion chamber to come in contact with means so placed as to deflect the air in planes at an angle to its direction of travel, and to impart to the air a whirling or rotating motion in a path surrounding, cutting through and mixing with the stream of finely-divided fuel. This action imparts to the fuel, as a consequence, a whirling or rotating motion in the same direction as that assumed by the air, and in so doing, thoroughly mixes the air with the fuel, thereby making a solid flame. The resulting turning over and over of the fuel in a gradually expanding volume brings all its particles into contact with the air and this insures complete combustion.

In carrying out the object of my invention I provide a substantially flat plate comprising blades set at an angle to the general plane of the plate, these blades being spaced apart so as to provide openings for the admission of air to the atomized fuel.

As the result of experience I have determined upon an angle of inclination of the blades of forty-five degrees to the plane of their supporting plate as giving the best results. This angle, however, can be varied according to the pressure, or according to the character of the fuel, or the character of the particular furnace to which the burner is applied. The blades which cause the deflection of the air are susceptible of various modifications coming within the scope of my invention, as, for example, they may be cast integral with a supporting plate, or may be secured thereto in fixed relation to one another and to the plate.

For the purpose of illustration, I have shown my invention as applied to a boiler furnace. Any suitable form of atomizer or so-called burner may be used, such, for example, as that shown in United States Patent 1,007,793, dated November 7, 1911. The burner is connected to a supply pipe 1 and terminates in proximity to a central opening in the plate; that is, it may terminate a short distance in front or rear of said plate, or within said opening, in order that the issuing stream of fuel may be acted upon immediately by the whirling air current. In burners used by me the fuel, as it is projected into the furnace chamber, assumes a conical shape and, to effect the desired intimate mixture therewith of the air necessary for complete combustion, I provide means comprising blades to deflect the column of air from its normal path as it enters the combustion chamber around the burner. These blades which effect a change in the direction of travel of the air may be supported in any suitable manner in an opening in the furnace wall. I prefer, however, to mount them on a plate, either integral with the plate or secured thereto by any suitable means. By employing a plate to which the blades are secured they may be conveniently handled and mounted in the furnace wall.

Referring to Figs. 3, 4 and 5, the plate 2 is in the form of a square or rectangular casting having suitable provision for securing it in an opening in the wall of the furnace. The plate comprises a central ring 3 to provide an opening through which the fuel may be projected from the burner. The latter does not completely fill the space within the ring so that, in addition to the air admitted between the blades, a relatively small column is admitted through the ring opening. From this ring radiate a series of blades 4, inclined inwardly from ribs 5.

In Figs. 6, 7 and 8 I have shown another form of air-deflecting plate in which the blades 6 are preferably of sheet metal having their ends secured to the plate 7 and a central ring 8. In Figs. 3 and 6 the blades of the plate do not overlap each other.

Figs. 9, 10 and 11 show a modification in which the blades 9 are preferably made of sheet metal and so cut as to overlap each other. In this form the outer ends of the blades are riveted or otherwise secured to a plate 10, and their inner ends secured between two ring plates 11. This overlapping of the blades broadens the flame and is of advantage, therefore, when a short, wide furnace is preferred.

In the constructions above described the plates as a whole are substantially flat, and the blades rigidly secured in position. The blades and openings between them may extend radially from the central opening, or may be tangential to said opening, as shown in Figs. 14 and 15.

As before stated, the burner terminates in proximity to the central opening 12 of the plate, either immediately in front, or at the rear, or within said opening, and the issuing fuel expands in the furnace chamber to assume the shape of a cone approximately as shown in Figs. 2 and 13. The column of air through the plate may be induced by the stack draft or by a forced draft. As the inner ends of the blades terminate in close proximity to the burner, the whirling motion begins immediately after the volume of air passes the plate so that the issuing stream of fuel is intermixed with and surrounded by the whirling volume of air practically immediately after it is ejected from the burner.

The number of blades in a plate and their arrangement relative to each other, are preferably as shown in the drawings; that is, I have shown 26 blades and they are so arranged relative to each other that the volume of air will be divided into columns, each column assuming a course determined by the angularity of the blades, the columns of air immediately uniting, after passing the blades, into a solid whirling column. The invention, however, is not limited to the preferred number of blades or to the exact arrangement shown, as the number may be varied and the relation of the blades may be changed to suit the particular furnace or fuel requirements.

In Figs. 12 and 13 I have shown the application of the invention with a forced draft air duct, the air duct 13 leading from any suitable source of supply and terminating at a point to completely inclose the substantially flat air-directing plate. However, as above stated, the air supply may be induced by the stack draft.

To still more thoroughly explain the nature of my invention, I will describe a specific example of practising it when using the air-deflecting plate and burner shown in Figs. 6, 7 and 8, and in full size in Figs. 16 and 17. There were twenty-six blades radiating from the ring 8, the latter having an external diameter of about two and three-quarter inches, and the opening in the plate 7 having a diameter of about eight inches. The internal diameter of the ring 8 was about two inches, or about one-quarter that of the diameter of the plate opening. The blades 6 were each flat and about three-eighths of an inch wide at the inner end and one inch wide at the outer end, and separated about one-eighth of an inch apart at the inner end and one-half of an inch apart at the outer end. They were set at an angle of about forty-five degrees. The outlet of the burner 14 was set about one-half inch back of the outer plane of ring 8. The burner 14 in this example was of the construction shown in the Peabody Patent No. 1,007,793, dated November 7, 1911, with an outlet orifice three-sixty-fourths of an inch in diameter. The pressure on the oil was about 185 pounds and the oil was what is commercially known as Texas crude of about 27B. The temperature of the oil entering the burner was about 175 degrees Fahrenheit. Natural draft was employed of two-tenths of an inch in the furnace. The furnace was seven feet, two inches wide, thirty-four inches high, and seven feet long. There were five burners and air-deflecting plates similar to that shown, arranged three in an upper tier and two in a lower tier, and in this experiment only the middle one of the upper tier was lighted; that being the one upon which observations were made. There were about seventy-five pounds pressure in the boiler which was of the type shown in Figs. 2 and 13 with the grate bars removed. By looking between the plates, the following observations were made. Ignition began in a plane about one and one-quarter inches behind the plate and about two inches from the front of the burner. The upper limit of the ignition was about the point 16 and the lower limit was about the point 17, distant about two and one-half inches from each other. In a plane about five inches back of the plate, the upper limit of the flame was at about the point 18, and the lower limit of the flame at about the point 19, being distant about seven inches from each other. The flame extended into the furnace a distance of from three and one-half to four feet back of the plate and at its farther end was about thirty-six inches in diameter. From these observations it therefore appears that the oil spray in this example diverged at an angle of about thirty-one degrees from the axis. To all appearances, the oil spray commenced its rotary or whirling motion by the time it reached the plane of ignition 16, 17, and continued the same until consumed. Looking at the flame through a peep-hole in the rear end of the furnace opposite the burner, the flame appeared to be a solid cone of flame filling the space between the eye and the burner. On the contrary, when the same conditions were maintained with the exception of omitting the blades 6, 6, the flame appeared to be a hollow cone. because the front of the burner was visible to the eye. The conclusion from this circumstance is, that the rotary or whirling motion imparted to the column of air by the blades 6, 6, from the outside to the center, causes the air to penetrate the cone of oil vapor and to extend the combustion inward into the cone.

As already stated, in the example given, the extent of the flame back of the plate is from three and one-half to four feet, whereas, under the same conditions, excepting the omission of the blades 6, 6, the flame will be lengthened to about seven feet. As shown, the plate is substantially flat so that the air passes through it substantially in a whirling column encompassing the non-whirling column of air passing through the ring 8, which in turn encompasses the spray of oil at the start, after which the inner column is whirled by contact with the outer column making a solid whirling column. I do not wish to limit myself, however, to a flat directing plate since I am aware that it may be inclined inward from the ring 8 to a considerable extent, say, not to exceed forty-five degrees from the plane of ring 8.

What I claim and desire to secure by Letters Patent of the United States is:—

1. The combination with a burner, of an air-deflecting device consisting of a substantially flat plate having a central opening and comprising a plurality of blades spaced apart to provide apertures for the admission of air and inclined to the plane of the plate to give to the air a whirling motion, the inner ends of said blades terminating adjacent said central opening, and said burner terminating in proximity to said opening.

2. The combination with a burner, of an air-deflecting device consisting of a substantially flat plate having a central opening and comprising a plurality of blades spaced apart to provide apertures for the admission of air and inclined to the plane of the plate to give to the air a whirling motion, said blades converging radially and their inner ends terminating adjacent said central opening, and said burner terminating in proximity to said opening.

3. The combination with a burner, of an air-deflecting device consisting of a substantially flat plate having a central opening and comprising a plurality of blades spaced apart to provide apertures for the admission of air and inclined to the plane of the plate to give to the air a whirling motion, said blades being wider at their outer ends than at their inner ends and the latter terminating adjacent said central opening, and said burner terminating in proximity to said opening.

4. The combination with a burner, of an air-deflecting device consisting of a substantially flat plate comprising a plurality of blades spaced apart to provide apertures for the admission of air and to give to the air a whirling motion, a central support for the inner ends of said blades, the latter extending radially from said support in planes inclined substantially 45° to the axis of their support, said support having a central opening, and said burner terminating in proximity to said opening.

5. The combination with a burner, of an air-deflecting device consisting of a plate having a plurality of blades extending radially at right angles to the axis of said burner and a central opening, said blades being inclined to the plane of the plate and spaced apart to provide apertures for the admission of air, and their inner ends terminating adjacent said central opening, and said burner terminating in proximity to said opening.

6. The combination with a burner, of an air deflecting device comprising a plurality of blades, a central support upon which said blades are radially mounted and inclined to the plane of the support and spaced apart to provide apertures for the admission of air, said central support having an opening, and the burner terminating in proximity to said opening.

In testimony whereof I have hereunto signed my name in the presence of two subscribing witnesses.

DAVID J. IRISH.

Witnesses:
M. E. McNINCH,
CHARLES S. JONES.